US 6,577,762 B1

(12) United States Patent
Seeger et al.

(10) Patent No.: US 6,577,762 B1
(45) Date of Patent: Jun. 10, 2003

(54) BACKGROUND SURFACE THRESHOLDING

(75) Inventors: Mauritius Seeger, Royston (GB); Christopher R. Dance, Trumpington (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/427,833

(22) Filed: Oct. 26, 1999

(51) Int. Cl.$^7$ .................................................. G06K 9/34
(52) U.S. Cl. ....................... 382/173; 382/180; 382/270; 382/272
(58) Field of Search ................................. 382/173, 176, 382/180, 224, 225, 237, 270, 272, 274, 286, 290; 358/462, 464, 465, 466

(56) References Cited

U.S. PATENT DOCUMENTS

| 4,823,194 A |   | 4/1989 | Mishima et al. ............. 358/282 |
|---|---|---|---|
| 5,889,885 A | * | 3/1999 | Moed et al. .................. 382/171 |

OTHER PUBLICATIONS

Yanowitz, S. D. and Bruckstein, A. M., "A New Method for Image Segmentation", Computer Vision, Graphics, and Image Processing, vol. 46, pp. 82–95, 1989. (Sep. 2, 1999).
Chan, Francis H. Y., Lam, F. K., and Zhu, Hui, "Adaptive Thresholding by Variational Method", IEEE Transactions on Image Processing, vol. 7, No. 3, pp. 468–473, 1998. (Aug. 30, 1999).
Niblack, W., "An Introduction to Digital Image Processing", pp. 113–116, Prentice Hall, 1986.(Aug. 30, 1999).
Taylor, M. J., and Dance, C. R., "Enhancement of Document Images from Cameras", SPIE, vol. 3305, pp. 230–241, 1998. (Sep. 2, 1999).
Taylor, M. J., and Zappala, A., (summer intern), "Image Enhancement and Thresholding of Images of Locally Bimodal Documents", Rank Xerox Invention Proposal LI/096059 dated Apr. 11, 1996, 11 pages.
Taylor, M.J. et al., Copending U.S. patent application No. 09/081269, entitled "Method and Apparatus for Enhancing and Thresholding Images", filed May 19, 1998.
Chan, F.H.Y. et al., "Adaptive Thresholding by Variational Method", IEEE Transactions on Image Processing, vol. 7, No. 3, Mar. 1998, pps. 468–473.
Niblack, W., "An Introduction to Digital Image Processing", © 1986 Prentice–Hall International (UK) Ltd, pps. 113–117.
Taylor, M.J. et al., "Enhancement of Document Images from Cameras", XRCE Ten Years in Cambridge 1988–1998 on CD, © 1998 Xerox Limited. pps. 1–12. D:\RESEARCH\NT\MTAULOR1.htm.
Wang, L. et al., "Direct Gray–Scale Extraction of Features for Character Recognition", IEEE Transactions on Pattern Analysis and Machine Intelligence, vol. 15, No. 10, Oct. 1993, pps. 1053–1067.
Yanowitz, S.D. et al., "A New Method for Image Segmentation", Computer Vision, Graphics, and Image Processing, 46, 1989, pps. 82–95.

* cited by examiner

Primary Examiner—Phuoc Tran

(57) ABSTRACT

A thresholding technique for generating a background image of a pixmap image is described. For one embodiment of the present invention, background image is used to generate a background threshold surface for thresholding a pixmap image. For another embodiment of the present invention, the background image is used to normalize the background of the pixmap image. In yet another embodiment of the present invention, the background image is used as input for other image processing algorithms such as extracting features from a grey-scale image for character recognition.

30 Claims, 8 Drawing Sheets

BACKGROUND SURFACE THRESHOLDING

FIELD OF THE INVENTION

The present invention relates to image processing, and more specifically, to thresholding techniques used in image processing.

BACKGROUND OF THE INVENTION

As technological advances in digital photography continue to increase the performance of digital cameras while reducing their cost, digital cameras may become widely used as document scanners in general office environments. For example, images from a hardcopy document may be captured by a camera positioned over a desktop and digitized for further processing and display on a computer monitor. This type of scanning promotes a "scan-as-you-read" interface between paper and electronic media and is often referred to as "over-the-desk" scanning. An example of such an over-the-desk scanning system is disclosed by Wellner in U.S. Pat. No. 5,511,148 entitled "Interactive Copying System."

When using a digital camera to scan documents, the camera images of the documents often need to be converted into high quality binary images for optical character recognition (OCR), which is used to translate the shapes recorded by the camera images into computer text. In general, most OCR software and numerous other image processing algorithms, such as page segmentation and skew detection algorithms, require binary images as input or can perform significantly faster using binary images. The presence of lighting variations, varying contrast between foreground and background regions of an image, bleed through (from text on the reverse side of a document), noise, blur, and low-resolution grey-scale images are factors that adversely affect the quality of binary images. When grey-scale images are not binarized correctly, OCR algorithms (as well as other image processing algorithms) become less effective.

Unfortunately, scanning with a digital camera sometimes produces camera images having a non-uniform grey-level background as a result of lighting variations. FIG. 1 illustrates an example of a camera image 100 recorded in an environment having lighting gradients. One common source of lighting variations is shadows cast on the document to be scanned. Camera image 100 illustrates that the foreground (e.g., text) and background regions may have similar grey-levels in the same portions of camera image 100 (e.g., upper right-hand comer and lower left-hand comer) such that it is difficult to differentiate between foreground and background regions.

A binary image may be produced from a grey-scale image by segmenting the grey-level image into a foreground region and a background region using thresholding techniques. When applying a thresholding technique, a threshold grey-level value for each point (or pixel) of an image is used to determine whether the pixel represents a foreground grey-level or a background grey-level. All foreground grey-level values are assigned one binary value and all background grey-level values are assigned the other binary value to generate a binary image.

When the background region of an image is uneven as a result of poor or non-uniform illumination conditions, a fixed (or global) grey-level threshold will not segment the image correctly. FIG. 2 illustrates an example of grey-scale camera image 100 binarized using a global threshold value. A large dark Region 200 indicates many background pixels that were misclassified as foreground pixels. As a result, it will be very difficult to accurately OCR the binary image shown in FIG. 2.

Adaptive thresholding techniques, which use more than one threshold value often provides better thresholding results than global thresholding techniques for images with non-uniform background grey-levels. FIG. 3 illustrates an example of grey-scale image 100 binarized using an adaptive thresholding technique. Although fewer background pixels are misclassified as foreground pixels in the binary image shown in FIG. 3 as compared to the binary image shown in FIG. 2, the misclassified pixels are still likely to cause OCR errors.

Some adaptive thresholding techniques use local average threshold values. For example, local average threshold values may be calculated based on a sample mean and a standard deviation within a small neighborhood (or window) of pixels as described in "An Introduction to Digital Image Processing", W. Niblack, pp. 113–116, Prentice Hall (1986). Alternatively, local average threshold values may be calculated by averaging the grey-scale values of neighboring edges as described in "Enhancement of Document Images from Cameras," M. J. Taylor et al., SPIE, vol. 3305, pp. 230, (1998).

Unfortunately, these local average thresholding techniques often amplify noise (on the boundaries of text) and are prone to misclassify large background areas as text. They are also sensitive to the scale (or window size) over which the average and variance measures are determined.

Other adaptive thresholding techniques, interpolate a threshold surface based on high gradient places (i.e., local maxima of gradient pixels). This threshold surface, which is constructed with an iterative interpolation scheme, is used to threshold an image. Examples of these techniques are discussed in "A New Method for Image Segmentation," Comput. Vision, Graph., Image Process., vol. 46, pp. 82–95 (1989) and "Adaptive Thresholding by Variational Method," IEEE Transactions on Image Processing, vol. 7, no. 3, pp. 468–473 (1998). These techniques often require edge detection techniques, thinning algorithms, and/or post-processing to remove "ghost" objects.

Although known adaptive thresholding techniques tend to provide higher quality binary images than global thresholding techniques, adaptive thresholding techniques do not fully address the problems (e.g., lighting variations, blur, and low resolution) associated with camera images. Thus, it would be advantageous to provide a thresholding technique that generates high quality binary images regardless of the hardware (e.g., video camera, scanners, etc.) to capture images while operating independently of resolution, font type and size of text. Furthermore, it is advantageous to provide thresholding techniques that increase the reliability and robustness of OCR algorithms, page segmentation algorithms, de-skewing algorithms, and other image processing techniques that use binary images as input.

SUMMARY OF THE INVENTION

It is an object of the present invention to generate a background image of a pixmap image, which can be used in various image enhancement techniques.

A system, method, and article of manufacture of the present invention for processing a pixmap image is described. A background image of the pixmap image is generated by computing a block average image of the pixmap image, a block variance image of the bitmap image and a variance threshold surface. The variance threshold surface is used to threshold the block variance image in order to segment the block average image into foreground and background regions. A background image of the pixmap image is then generated based upon the segmented foreground and background regions. In a preferred embodiment of the present invention, the background image of the pixmap is generated by replacing all pixels in the foreground region with interpolated background pixels.

For various embodiments of the present invention, the background image of the pixmap image is used to perform additional image processing on the pixmap image. For example, the background image is used to generate a background threshold surface, which is used to binarize the pixmap image by thresholding the pixmap image into foreground and background regions.

For alternative embodiments of the present invention, the background image is used to produce an image having a more uniform background grey (or color) level by normalizing a pixmap image. For example an operation using the background image is performed on the pixmap image. The operation may include subtracting the background image from the pixmap image, dividing the pixmap image by the background image, or other operations based on the background image.

In yet other embodiments of the present invention, the background image is used as input or parameter values for other image processing algorithms such as grey-scale character recognition algorithms.

Other objects, features, and advantages of the present invention will be apparent from the accompanying drawings and from the detailed description that follows below.

BRIEF DESCRIPTION OF THE DRAWINGS

The present invention is illustrated by way of example and is not limited by the figures of the accompanying drawings, in which like references indicate similar elements and in which.

DETAILED DESCRIPTION

A background image B (also referred to as a lighting surface) of a pixmap image I is determined in accordance with various embodiments of the present invention. The pixmap image may represent a grey-scale image or a color image where each pixel (or picture element) in a raster display is represented by more than one bit. For one embodiment of the present invention, the background image B represents the intensity measured at each pixel in the absence of any printed text on a white page. A simple variance segmentation technique is used to generate the background image B.

For other embodiments of the present invention, the background image B may be used to segment the pixmap image into background and foreground regions in a reliable manner despite the presence of lighting gradients, varying contrast, bleed through (from text on the reverse side of a document), noise, blur, and low resolution. Once an image is properly segmented, it can be converted into a binary image. Proper binarization of an image is particularly important when processing an image for optical character recognition (OCR) which produces an electronic version of the image. In general, most OCR algorithms and many other image processing algorithms require binary images as input or produce better results when binary images are used as input. Furthermore, the background surface thresholding technique described below is relatively insensitive to the scale of the text and hence works well for a large range of font sizes and image resolutions.

One advantage of the thresholding technique of the present invention over known thresholding techniques described above is that a grey-scale image can be properly segmented even though the grey-scale image does not have a uniform background grey-level. Camera images, such as image 100 shown in FIG. 1, often produce grey-scale images having an uneven background grey-level.

Figure 1:
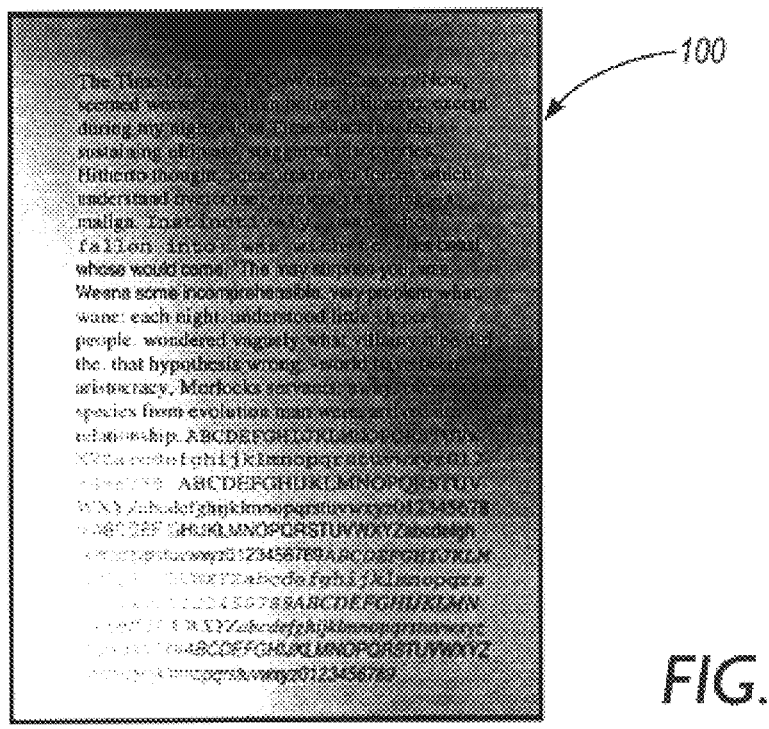
FIG. 1 illustrates a grey-scale camera image of a document having a non-uniform background grey-level.
Figure 2:
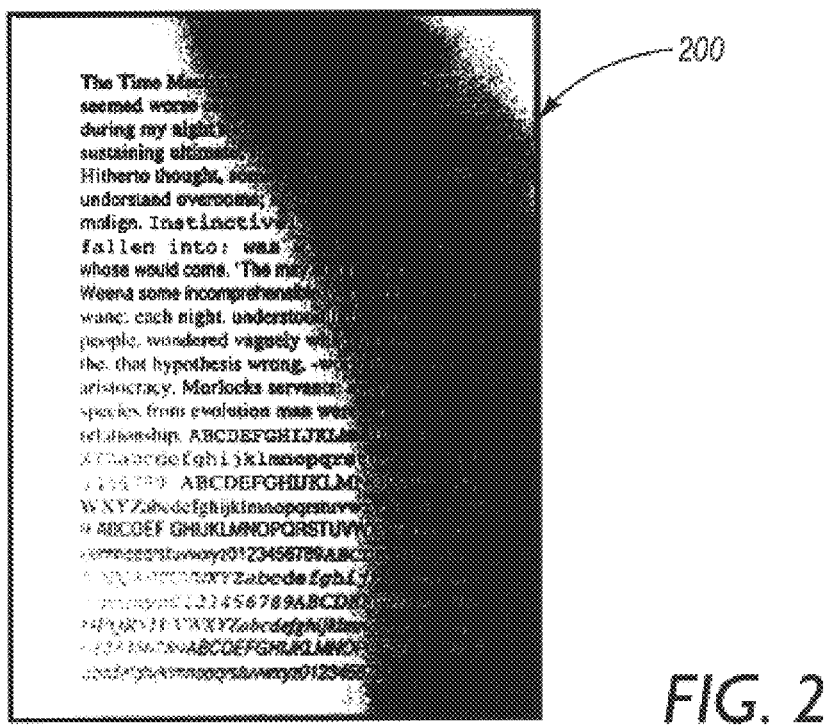
FIG. 2 illustrates a binary image of the grey-scale camera image of FIG. 1, which was binarized using a global thresholding technique.
Figure 3:
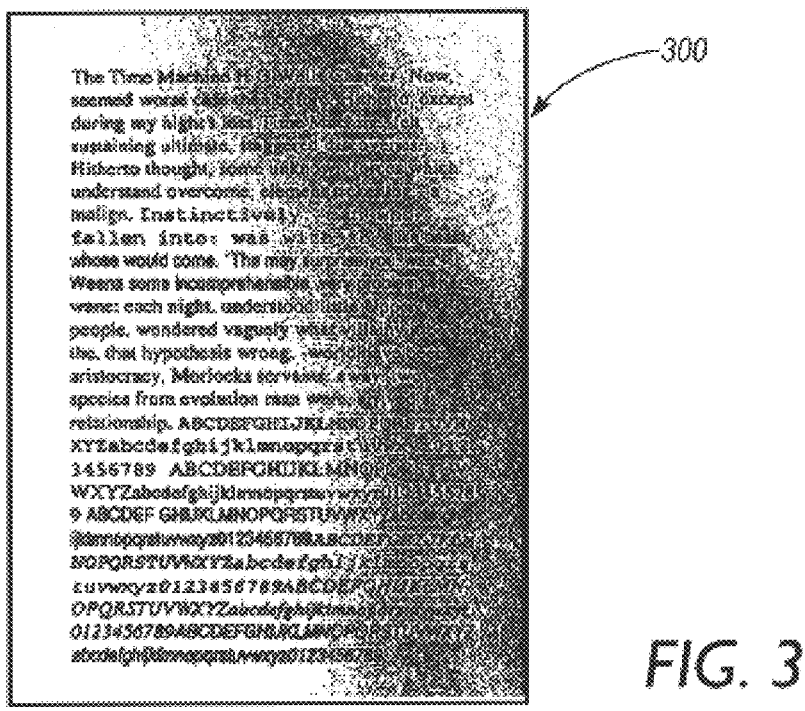
FIG. 3 illustrates a binary image of the grey-scale camera image of FIG. 1, which was binarized using an adaptive thresholding technique.
Figure 4:
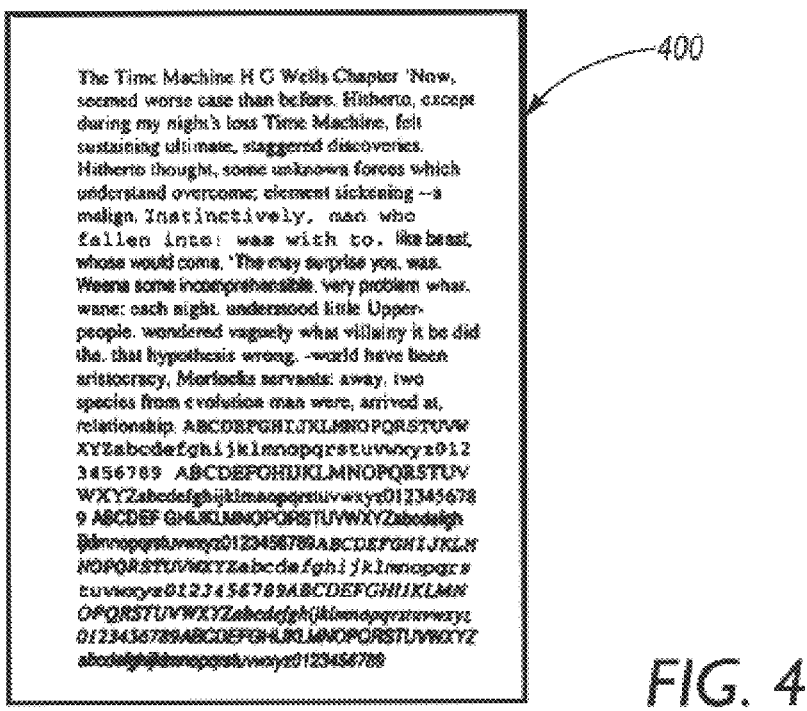
FIG. 4 illustrates a binary image of the grey-scale camera image of FIG. 1, which was binarized using a background surface thresholding technique according to one embodiment of the present invention.

FIG. 4 illustrates an example of a binary image 400 of grey-scale image 100 shown in FIG. 1. The binary image 400 represents a document page which has been accurately segmented into a foreground region (i.e., text) and a background region in accordance with one embodiment of the present invention despite the extraneous shading present in grey-scale image 100 caused by poor lighting conditions while capturing the image.

For alternative embodiments of the present invention, the background image B, which represents a lighting surface, may be used to normalize the effects of lighting variations in camera images (or other types of pixmap images). This can be accomplished by subtracting the background image B from the grey-scale image I or by dividing image I by the background image B. Such normalization can be used to improve the legibility of text.

In yet further embodiments of the present invention, the background image B, may be used as a parameter value required by a grey-scale character recognition method or other image processing algorithms. A grey-scale character recognition method eliminates binarization by extracting features from grey-scale images. An example of such a gray-scale character recognition method is disclosed in Wang, L. and Pavlidis, T., "Direct grey-scale extraction of features for character recognition", IEEE Transactions on Pattern Analysis and Machine Intelligence, No. 10, Vol. 15, October 1993, pp. 1053–1067. According to this method, a digitized grey-scale image is treated as a noisy sampling of the underlying continuous surface, and desired features are obtained by extracting and assembling topographical characteristics of this surface.

Although the following figures describe image processing performed on a grey-scale image, the various image processing techniques that use a background image may also be applied to other types of pixmap images, for example, color images. Additionally, it should also be noted that the pixmap image of the present invention is not limited to a pixmap image obtained from a camera but may be extended to pixmap images obtained from various other image capture devices.

Figure 5:
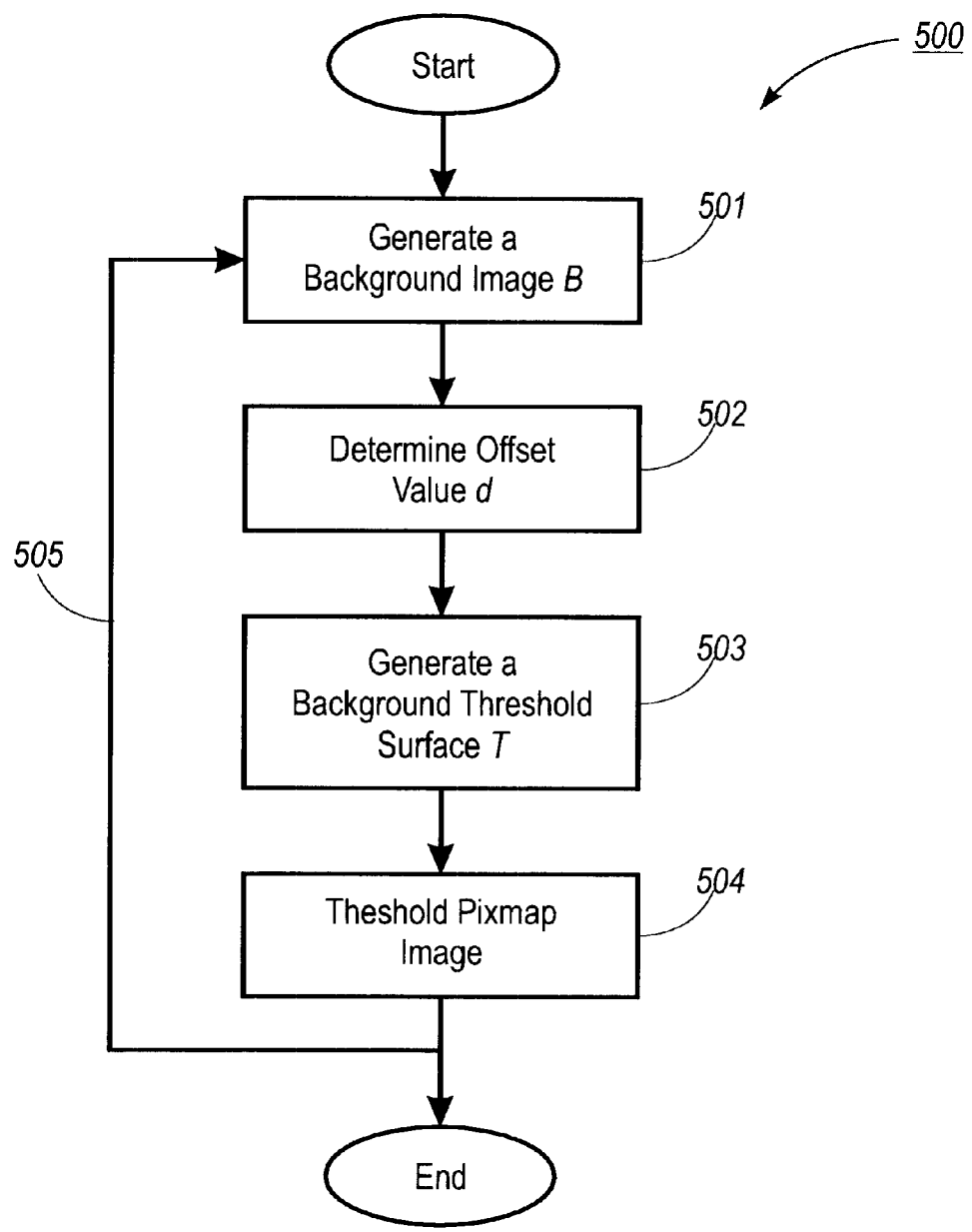
FIG. 5 illustrates a logic flow diagram for converting a grey-scale image into a binary image according to one embodiment of the present invention.

FIG. 5 illustrates a logic flow diagram 500 for converting a grey-scale image I into a binary image in accordance with one embodiment of the present invention. Accurate conversion of a grey-scale image I having p pixels into a binary image is accomplished by generating a background image B having p pixels, as shown in box 501. The background image B represents the background region of a grey-scale image I. The background image B includes a background grey-level value for every pixel $B_p$. The generation of the background image B will be described in more detail below in accordance with logic flow diagram 600.

Next, in box 502 an offset value d is computed. For one embodiment of the present invention, the offset value d is a global offset which is computed based upon the average difference between background threshold surface pixel values $B_p$ and grey-scale image pixel values $I_p$ for pixels at which the grey-scale pixel values are less than the background surface pixel values (e.g., $I_p < B_p$).

For alternative embodiments, the offset value d may represent local offset values rather than a global offset. A local offset d is computed locally in each block using the same method as before but applied only to the pixels in each block.

In box 503, the background image B and the offset value(s) are used to generate the background threshold surface T.

In box 504, the grey-scale image is segmented into a background region and a foreground region using a background threshold surface T for thresholding. When thresholding a grey-scale image I, each pixel value in the grey-scale image $I_p$ is compared to a pixel value in the background threshold surface $T_p$. In general, grey-scale pixel values $I_p$ less than threshold pixel values $T_p$ are assigned a first binary value while grey-scale pixel values $I_p$ greater than background threshold values $T_p$ are assigned a second binary value.

For one embodiment of the present invention, the background threshold surface T is based upon the equation: T=B−fd. Thus, if the pixel value for the grey-scale image $I_p$ is less than $T_p$ (i.e., $B_p$−fd) then the pixel value for the binary image is set to black, otherwise the pixel value for the binary image is set to white. For one embodiment, optimal results have been achieved when f=1.5, but the exact value of f may vary depending on the OCR software that is used.

Figure 6:
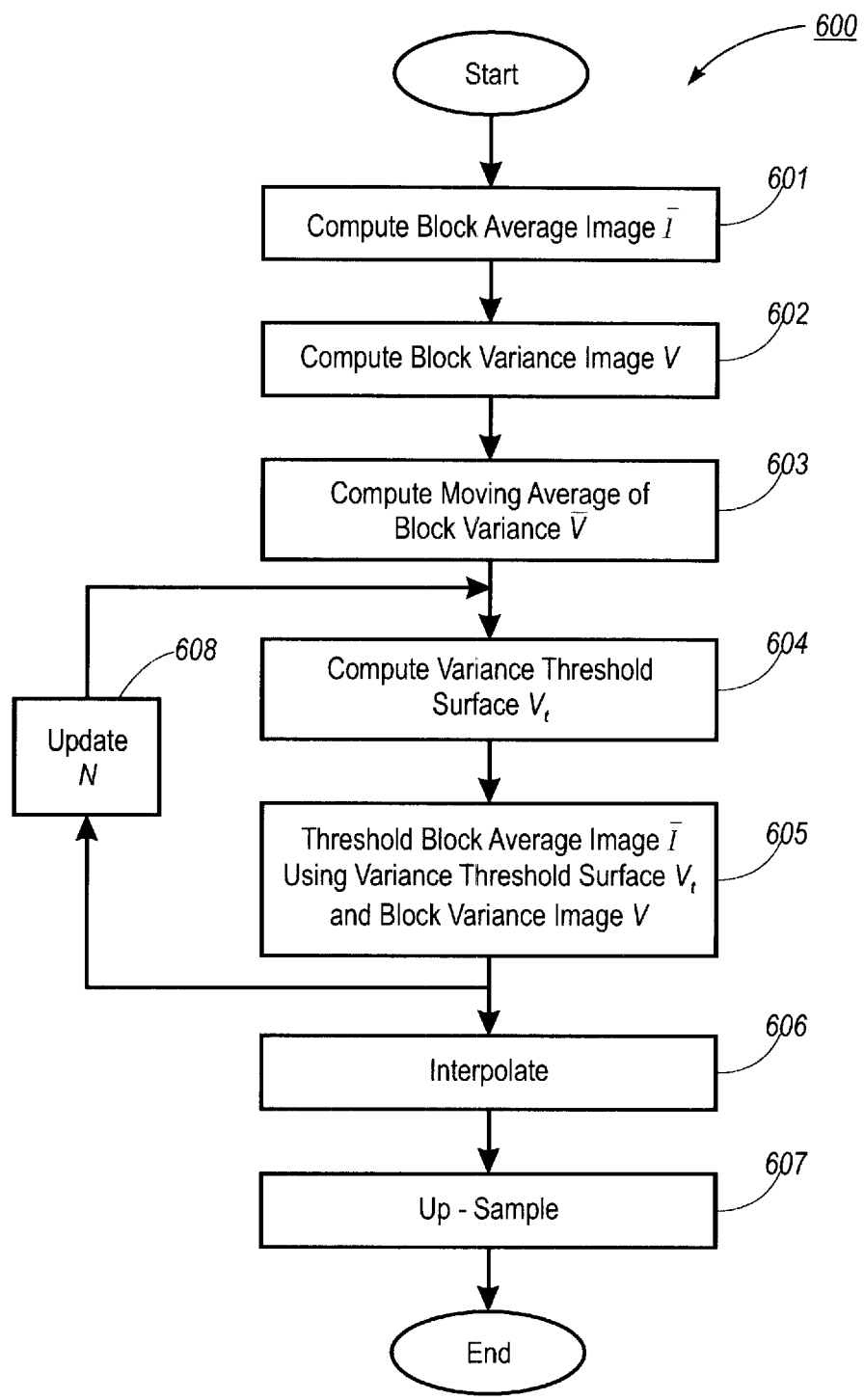
FIG. 6 illustrates a logic flow diagram for generating a background image according to one embodiment of the present invention.

FIG. 6 illustrates a logic flow diagram 600 for generating a background image B in accordance with one embodiment of the present invention. In box 601, a block average image $\bar{I}$ is computed from a grey-scale image I. For one embodiment of the present invention, each block represents a subgrouping of pixels such as a 7 by 7 pixel block. For alternative embodiments, blocks may include a different number or arrangement of pixels.

Figure 7:
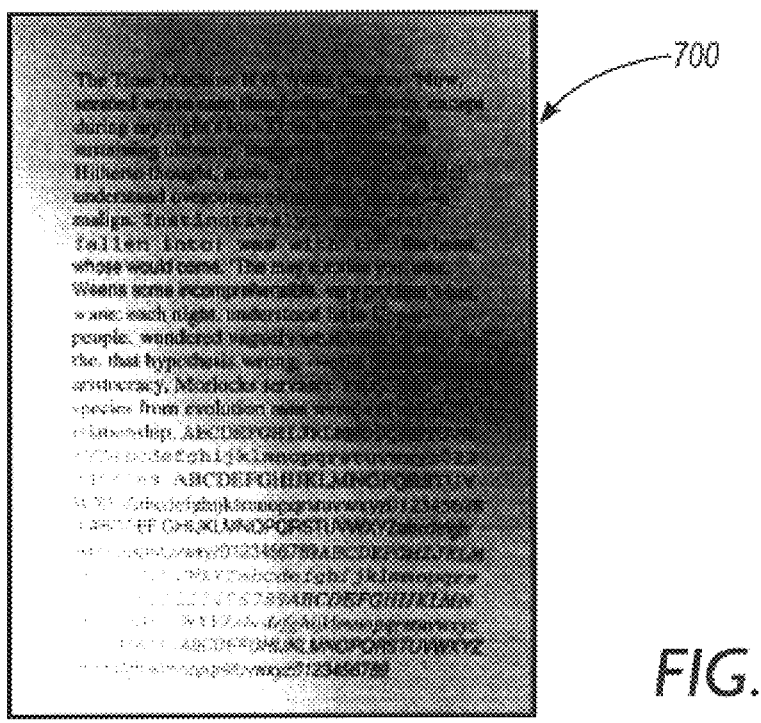
FIG. 7 illustrates a block average image of the grey-scale camera image of FIG. 1 computed in accordance with one embodiment of the present invention.

To generate a block average image $\bar{I}$, a mean grey-value is computed for each block. For example, if 7 by 7 pixel blocks are used, then each block has 49 pixels values, each value representing a grey-level value. The mean value for the 49 pixel values is determined for each block. This results in a block average image $\bar{I}$, of size (w/7) by (h/7), where w represents the width of a grey-scale image I and h represents the height of the grey-scale image I. FIG. 7 illustrates a block average image 700 of grey-scale image 100 shown in FIG. 1. As compared to grey-scale image 100, block average image 700 has a size reduced by the dimensions of the block.

Next, a block variance image V of grey-scale image I is computed as shown by box 602. The block variance image V includes a variance block value $V_b$ for each block. In general, $V_b$ represents the overall change of pixel values from the mean pixel value for each block. For one embodiment of the present invention, the block size is 7 by 7 pixels. It should be noted that the block size for the block average image $\bar{I}$ and the block variance image V are the same size.

For one embodiment of the present invention, the variance $V_b$ for each block of grey-scale image I can be calculated based upon the following equation:

$$V_b = \frac{\sum_{i=1}^{i=n} (\bar{I}_b - I_{bi})^2}{n}$$

where n represents the number of pixels in each block, $I_{bi}$ represents the value of pixel i in block b, and $\bar{I}_b$ represents the pixel value of the block average image $\bar{I}$ for block b.

For an alternative embodiment, the mean of each block used to compute the block average image $\bar{I}$ (box 601) and the variance of each block used to compute the block variance image V (box 602) may be computed by using the following two sums:

$$S_b = \sum_{i=1}^{i=n} (I_{bi}) \text{ and } S_{b2} = \sum_{i=1}^{i=n} (I_{bi})^2.$$

The mean grey-value for each block is determined by the equation $$\bar{I}_b = \frac{S_b}{n},$$

and the variance for each block is determined by the equation $$V_b = \frac{S_{b2}}{n} - (\bar{I}_b)^2.$$

Figure 8:
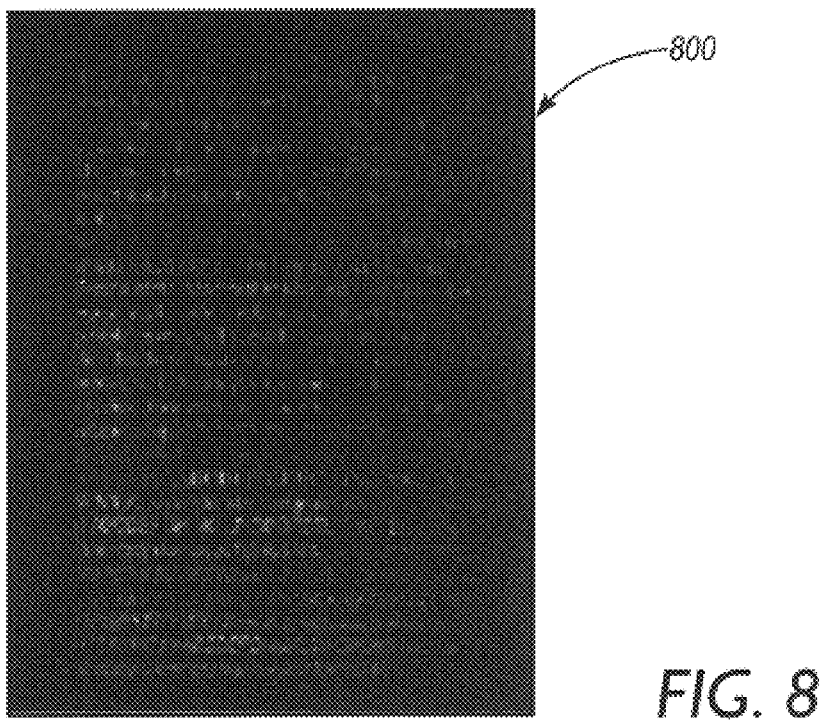
FIG. 8 illustrates a block variance image of the grey-scale camera image of FIG. 1 computed in accordance with one embodiment of the present invention.

FIG. 8 illustrates a block variance image 800 of grey-scale image 100 shown in FIG. 1. The dark regions indicate low variance regions and the light regions indicate high variance regions. In general, the background pixels are typically represented by the low variance regions and the foreground pixels are represented by the high variance regions. This is based on the assumption that grey-scale values change slowly with position if a region is background. This is generally true if the text is printed on a page of uniform color and lighting variations are caused by diffuse shadows. Since text has sharp boundaries the variance of a region is typically larger that the background variance if the region includes edges of characters.

Referring back to FIG. 6, in box 603, a moving average of the block variance image $\overline{V}$ is computed by taking the mean of all possible windows of a specified size. The mean variance image $\overline{V}$ indicates whether the variance of a block is bigger or smaller than the average variance. If it is larger than the average variance then there is probably text in this region. So the window size determines over what area this average variance is computed. If this window is too small, then it's a poor measure of the average, if it is too big it does not reflect local changes accurately.

For one embodiment of the present invention, the mean variance image $\overline{V}$ is based on a 15 by 15 pixel block moving average of block variance image V. This particular window size (e.g., 15 by 15 pixel block) was selected based upon experimental results. For alternative embodiments, the size of this window may vary. In general, the larger the window size, the smoother the block variance image $\overline{V}$.

Next, in box 604, a variance threshold surface $V_t$ can be computed based on the following equation:

$$V_t = \alpha \overline{V} + N$$

where, $\alpha$ is a constant and N represents an estimate of the variance due to noise in the background region. The constant $\alpha$ is determined empirically. For one embodiment of the present invention, $\alpha=0.3$ and $N=16$ was used for an initial pass of the algorithm. In a second pass, N may be replaced with the average variance of the background. The average variance of the background is computed by taking the average of those pixels in block variance image V which correspond to the background regions (as determined by $V_t$). Box 608 illustrates the iterative updating of N.

In box 605, the block average image $\overline{I}$ is segmented by thresholding the block variance image V with the variance threshold surface $V_t$. The variance threshold surface $V_t$ is used to remove text regions from the block average image $\overline{I}$. In other words, the block average image $\overline{I}$ is segmented into foreground and background regions based upon the variance threshold surface $V_t$ and the block variance image V.

For example, if a pixel in the block variance image V is larger than a corresponding pixel in the variance threshold surface $V_t$ then a corresponding pixel in the block average image $\overline{I}$ is designated as a foreground pixel, otherwise it is designated as a background pixel. All designated foreground pixels may be assigned a first value and/or all designated background pixels may be assigned a second value. For one embodiment of the present invention, all text regions are assigned a unique pixel value (e.g., 0).

Figure 9:
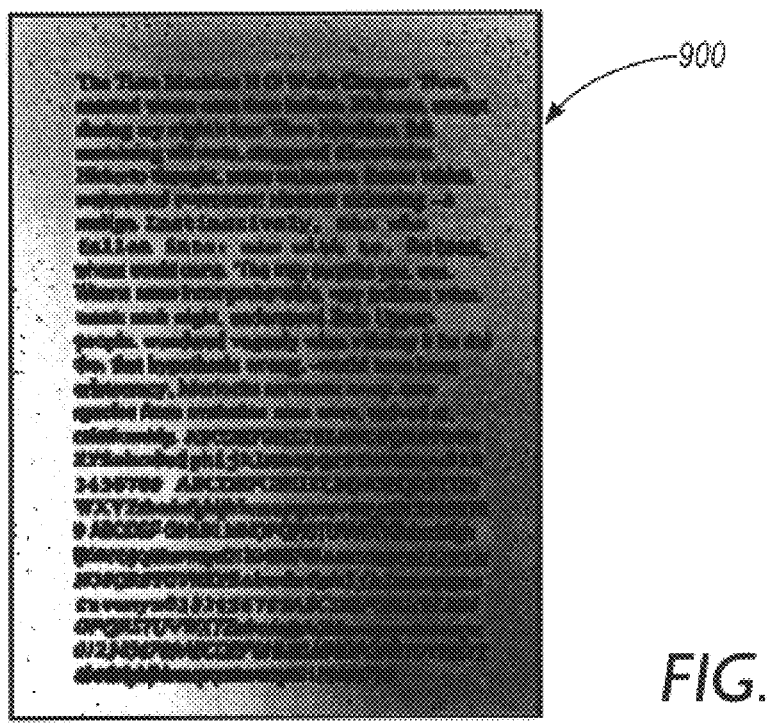
FIG. 9 illustrates the result of variance thresholding the block average image of FIG. 7 in accordance with one embodiment of the present invention with regions of high variance removed (i.e., shown in black)

For one embodiment of the present invention, each pixel in the block average image $\overline{I}$, the block variance image $V_t$ and the variance threshold surface $V_t$ corresponds to a pixel block (e.g., 7 by 7 pixel block) in the grey-scale image I. FIG. 9 illustrates a block average image 900 after applying the variance threshold $V_t$. Image 900 is segmented into text and background regions.

Figure 10:
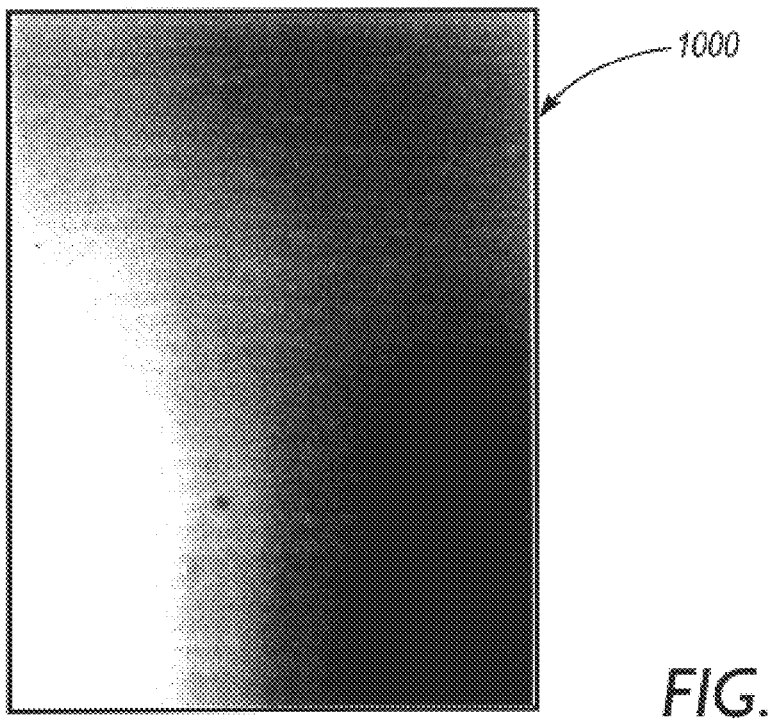
FIG. 10 illustrates a background image of the camera image of FIG. 1 computed in accordance with one embodiment of the present invention.

In box 606, a background image B is obtained by replacing pixel values in a block average image $\overline{I}$, labeled as foreground (or text) regions with interpolated values. For one embodiment of the present invention, a block average image $\overline{I}$ is interpolated linearly along rows and columns using neighboring background regions. The final result is obtained by averaging the row and column interpolates. For alternative embodiments, rather than using linear interpolation, it is possible to fit a smooth surface to the existing data points. In this way, smoothness constraints can be incorporated to reduce the high frequency contribution of text caused by false segmentation. FIG. 10 illustrates a background image 1000 for the grey-scale image 100.

In box 607, the background image B is then upsampled to increase the resolution to match the resolution of the original grey-scale image I. For example, the background image B is upsampled by a factor of 7 in each direction when using 7 by 7 pixel blocks to compute the block average image $\overline{I}$. For one embodiment of the present invention, the background image B is upsampled using bilinear or bicubic interpolation by the block size.

For one embodiment of the present invention, the background image B generated by logic flow diagram 600 is then used for determining the offset value(s) d in accordance with box 502 and thresholding the grey-scale image I in accordance with box 503. The binary image 400 illustrates the results of applying the background surface thresholding method described above.

It should be noted that boxes 601, 602, 603, 604 and 605 represent the initial segmentation of the grey-scale image I into foreground and background regions. For alternative embodiments of the present invention, the initial segmentation of grey-scale image/may be performed using a histogram analysis of the variance to determine the variance threshold, edge or high frequency detection, or any other segmentation technique.

For alternative embodiments of the present invention, the background thresholding technique described in logic flow diagrams 500 and 600 may be performed in an iterative manner. This can be accomplished by replacing the initial segmentation into text and background (using variance thresholds) with the output of the previous background surface thresholding result as shown by arrow 505 in FIG. 5.

The background surface thresholding techniques described above can be used to segment grey-scale images, color (e.g., based on red, green or blue or cyan, magenta or yellow) images, and any other type of pixmap image. In other words, the background thresholding techniques described by the logic flow diagrams 500 and 600 can be applied to grey-scale images and color images. However, when binarizing color images in accordance with the background thresholding techniques described in logic flow diagrams 500 and 600 some additional processing may be required.

For example, the luminance of a color image can be computed before applying the background surface thresholding technique. Alternatively, the background thresholding technique can be applied to each color channel separately so that the results of each channel can be combined in some manner, for example by AND-ing or OR-ing.

The binary image may be further enhanced by performing additional image processing techniques on the grey-scale image prior to performing the background surface thresholding techniques described above. For example, a de-blurring technique used to partially restore the degradations of the image due to camera or motion blur may precede the background threshold surfaces techniques. Although there are numerous de-blurring techniques available, a sharpening technique described in "Fundamentals of Digital Image Processing", Anil K. Jain, pp. 249–250, (1989) or FIR filtering technique which assumes a Gaussian point spread function (PSF) described in "Small Convolution Kernels for High-Fidelity Image Restoration", S. Reichenbach and S. Park, IEEE Trans. Signal Processing 39(10), (1991) are generally sufficient if the PSF cannot be determined accurately. These techniques yield good results and are computationally efficient.

Upsampling is another technique that may be used to enhance the grey-scale image prior to performing background surface thresholding. Upsampling prior to binarization helps to trade grey-scale resolution for spatial resolution. Upsampling may be performed by bilinear or bicubic upsampling of the grey-scale image by a factor of 3 or other upsampling methods such as edge preserving interpolation schemes. An example of such an edge preserving interpolation scheme is disclosed in Allebach, J. P., and Wong, P. W., "Edge directed interpolation", in Proceedings of IEEE International Conference on Image Processing, ICIP-96, September 1996, Lausanne, Switzerland, pp. 707–710.

De-blurring techniques and upsampling techniques are used to recover the spatial information lost due to blur and low-resolution, respectively. These two stages are particularly advantageous when binarizing camera images of documents. The de-blurring stage partially restores the degradations of the image due to camera blur. The upsampling stage allows intensity resolution (256 levels for grey-scale images) to be traded for spatial resolution (binary super resolution).

Figure 12:
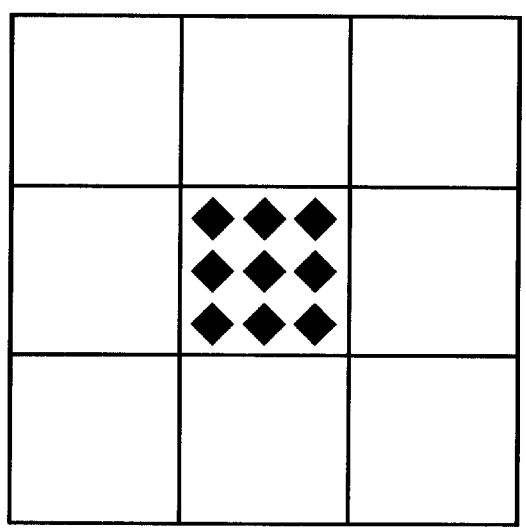
FIG. 12 illustrates a bicubic interpolation scheme according to one embodiment of the present invention.

For one embodiment of the present invention, a bicubic interpolation scheme which generates nine points offset by half an interpolated-resolution pixel from the original grid, as shown in FIG. 12, is used. The support of this interpolate consists of a 4×4 square of uninterpolated pixels. The pixels are combined row-wise and then column-wise using the interpolating kernel:

$$\frac{\begin{bmatrix} -7 & 105 & 35 & -5 \\ -8 & 72 & 72 & -8 \\ -5 & 35 & 105 & -7 \end{bmatrix}}{128}$$

This bicubic interpolation may be implemented using a 16-bit look-up table.

Converting pixmap images into binary images using the background thresholding methods in accordance with various embodiments described above segments the foreground from the background correctly in the presence of lighting gradients, varying contrast, bleed through (from text on the reverse side of documents), noise, blur, and low-resolution. Furthermore, the background thresholding methods described above is often effective regardless of the hardware (video cameras, scanners, or other image capture system) used to capture the images and is independent of the resolution, font type and font size of the text.

The background thresholding techniques described above can be implemented in over-the-desk scanning environments such as the system described in U.S. Pat. No. 5,511,148 to Wellner entitled "Interactive Copying System". Over-the-desk scanning generally refers to capturing images of hardcopy documents positioned on a desktop with a camera positioned above the desktop. These captured images are digitized for further processing and then displayed on a computer monitor.

Figure 11:
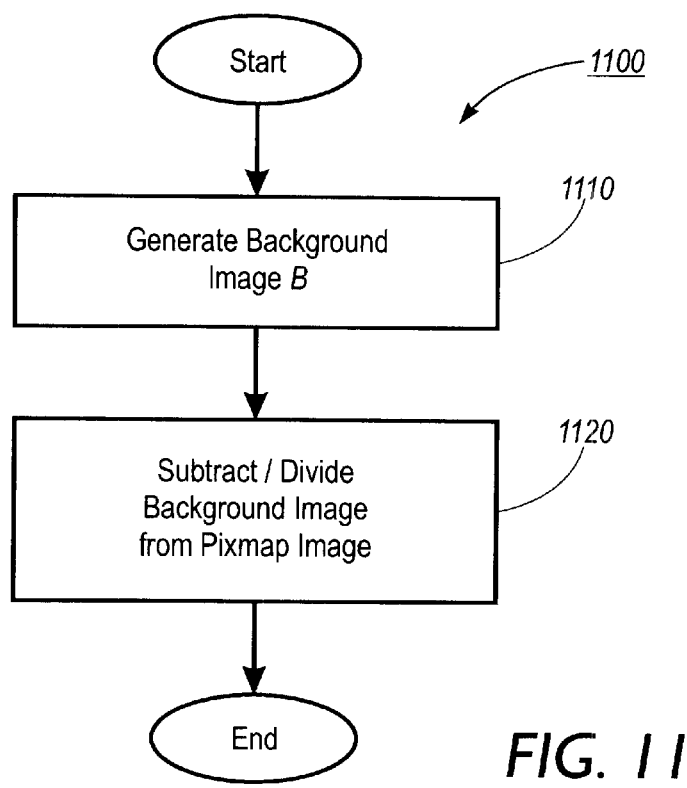
FIG. 11 illustrates a logic flow diagram for converting an image having a non-uniform background grey-level into an image having a more uniform background grey-level in accordance with one embodiment of the present invention.

For an alternate embodiment of the present invention, the background image B may be used to produce an image having a more uniform background grey (or color) level. FIG. 11 illustrates a logic flow diagram for normalizing the effects of lighting variations in a background image of a grey-scale image is generated by using a variance segmenting technique, such as the technique described by logic 600. The background image B includes a background pixel value for each pixel value in the grey-scale image I. In box 1120, the background image B is subtracted from the grey-scale image I or I is divided by B to remove the effects of lighting variations. This technique can be applied to various types of pixmap images used to convert a non-uniform grey (or color) level background into a more uniform grey (or color) level background.

In yet other embodiments of the present invention, the background image B may be used as input into other image processing algorithms, such as grey-scale character recognition methods.

Figure 13:
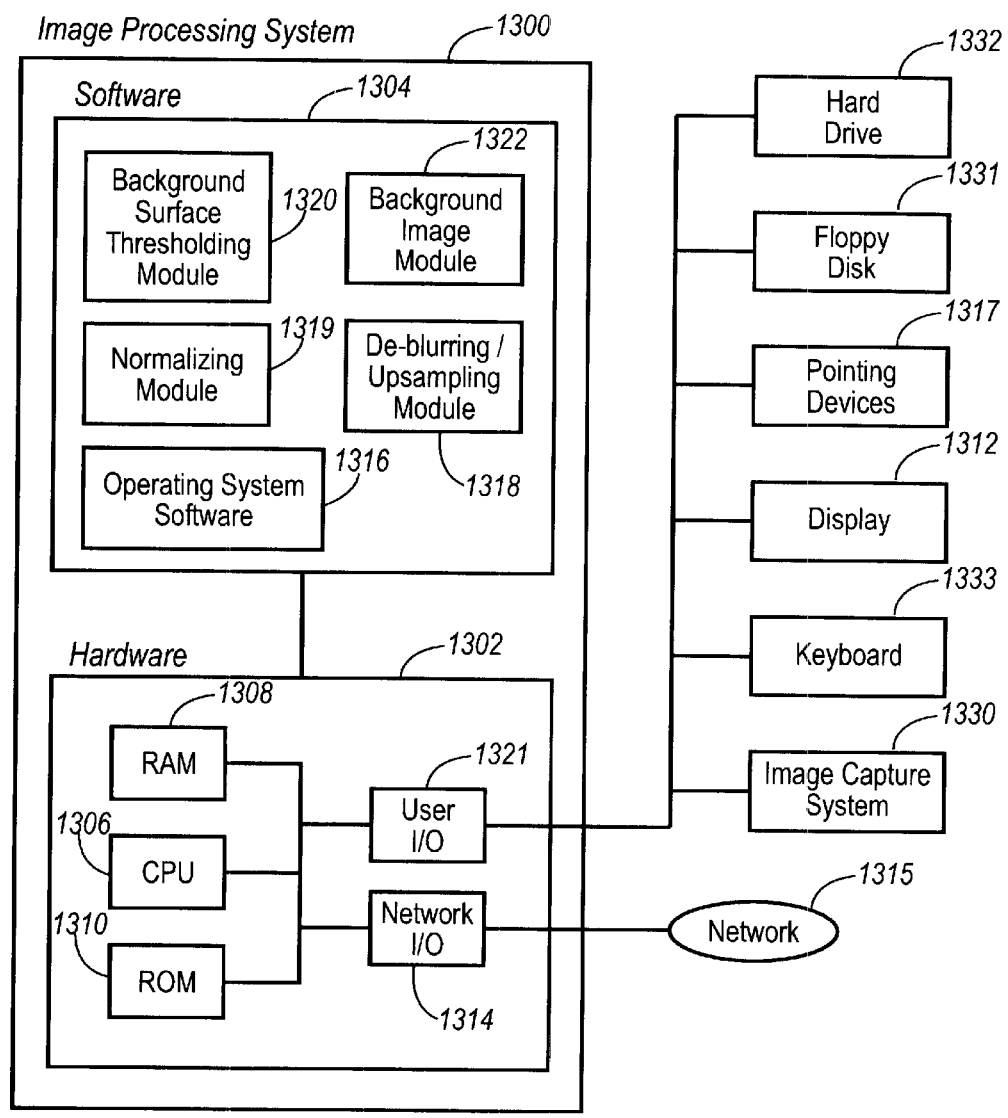
FIG. 13 illustrates an image processing system according to one embodiment of the present invention.

FIG. 13 illustrates an example of an Image Processing System 1300 used to perform the background thresholding technique in accordance with the described embodiments. For one embodiment of the present invention, Image Processing System 1300 may be a computer system, which includes Software Components 1304 and Hardware Components 1302. The computer system can be a personal computer, workstation, etc.

The Hardware Components 1302 include a Processing Unit (i.e., CPU) 1306, Random Access Memory (RAM) 1308, Read Only Memory (ROM) 1310, User Input/Output ("I/O") 1321, and Network I/O 1314. The User I/O 1321 may be coupled to various input and output devices, such as a Keyboard 1333, a Pointing Device 1317 (e.g., pointing stick, mouse, etc.), a Display 1312, a Floppy Disk 1331 a Disk Drive 1332, etc.

RAM 1308 is used by CPU 1306 as a general storage area and as scratch pad memory, and can also be used to store downloaded image data (e.g., pixmap image data, binary image data, etc) for display on Display 1312. ROM 1310 can be used to store instructions executed by CPU 1306.

Display 1312 is an output device that displays image data provided by CPU 1306 or other components in Image Processing System 1300. In the described embodiments, Display 1312 is a raster device representing a rectangular grid of pixels which displays images on a screen, as is well known to those skilled in the art. That is, a pixmap can be input to Display 1310 and the bits of pixmap can be displayed as pixels. An input pixmap can be directly displayed on Display 1310, or components of Image Processing System 1300 can first render codes or other image descriptions from a page description file into pixmaps and send those pixmaps to be displayed on display 1312, as is also well known. Displays such as CRTs, LCD, etc. are suitable for the present invention.

Additionally, User I/O 1321 may be coupled to an Image Capture System 1330 such as a video camera system, scanning devices (e.g., flat-bed or hand-held scanners) or other device for capturing images of hardcopy documents.

Furthermore, User I/O 1312 may be coupled to a Floppy Disk 1331 and/or a Hard Disk Drive 1332 to store image data. Other storage devices such as nonvolatile memory (e.g., flash memory), PC-data cards, or the like, can also be used to store data used by Image Processing System 1300.

The Network I/O 1314 provides a communications gateway to a Network 1315 such as a LAN, WAN, the internet, etc. The Network I/O 1314 is used to send and receive data over a Network 1315 connected to one or more computer systems or peripheral devices (such as Image Capture System 1330).

The Software Components 1304 includes an Operating System Software 1316 and one or more of the following software modules: a Background Surface Thresholding Module 1320, a De-Blurring and/or Upsampling Module 1318, a Normalizing Module 1319, and a Background Image Module 1322. The Operating System Software 1316 controls the basic functions of Image Processing System 1300.

The Background Image Module 1322 is the software unit that generates a background image B using a variance segmentation technique, such as the technique described by the logic flow diagram shown in FIG. 6. The background image B generated by Module 1322 may be used to perform background surface thresholding (as shown by module 1320) or background normalizing (as shown by module 1319, or used as input into other image processing algorithms such as parameter values for various grey-scale character recognition methods.

The Background Surface Thresholding Module 1320 is the software unit that converts a pixmap image into a binary image by thresholding the pixmap image with a background threshold surface T which is based on the background image B (or lighting surface). The pixmap image may represent a hardcopy document such as one captured by Image Capture System 1330 (e.g., a camera image).

The De-blurring Module and/or Upsampling Module 1318 is the software unit that may be used to perform image processing techniques to recover spatial information of an image lost due to blur and/or low-resolution. These techniques may be used to improve the results obtained from background surface thresholding performed by Module 1320.

The Normalizing Module 1319 is the software unit that normalizes the background of a pixmap image in accordance with one embodiment of the present invention. An example of a background normalizing method is described by the logic flow diagram shown in FIG. 11. Normalizing Module 1319 may be used to produce a more uniform background grey-level or a more uniform background color-level.

For various embodiments of the present invention, Image Processing System 1300 is a general purpose computer that can be implemented by any one of a plurality of configurations. For example, Processor 1306 may in alternative embodiments, be defined by a collection of microprocessors configured for multiprocessing. In yet other embodiments, the functions provided by Software Components 1304 may be distributed across multiple computing devices (such as computers and peripheral devices) acting together as a single processing unit. Furthermore, one or more aspects of Software Components 1304 may be implemented in hardware, rather than software. For other alternative embodiments, Image Processing System 1300 may be implemented by data processing devices other than a general purpose computer. For example, the background surface thresholding techniques of the present invention may be implemented in hardware and/or software in a portable device, such as a document camera for document image processing, page segmentation, OCR, and/or compression.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing a pixmap image, comprising:
   (a) generating a background image of the pixmap image using a variance segmentation technique;
   (b) computing one or more offset values;
   (c) generating a background threshold surface based upon the background image and the one or more offset values;
   (d) comparing the background threshold surface to the pixmap image to determine whether each pixel of the pixmap image represents a foreground pixel or a background pixel;
   (e) assigning a first binary value to all foreground pixels and assigning a second binary value to all background pixels; and
   (f) generating a binary image based upon the assigned first and second binary values;
   wherein (a) includes:
   (i) subdividing the pixmap image into a plurality of blocks, each block representing a plurality of pixels;
   (ii) computing a block average image of the pixmap image;
   (iii) computing a block variance image of the pixmap image;
   (iv) computing a moving variance image of the block variance image;
   (v) computing a variance threshold surface based upon the moving variance image;
   (vi) comparing the variance threshold surface to the block variance image to determine whether each pixel of the block average image represents a background pixel or a foreground pixel;

(vii) replacing all foreground pixel values with estimated background pixel values to create a background image of the block average image; and (viii) upsampling the background image of the block average image to create the background image of the pixmap image.

2. The method of claim 1, wherein (i) includes subdividing the pixmap image into the plurality of 7 by 7 pixel blocks.

3. The method of claim 1, wherein (ii) includes computing the block average image by determining the mean of all pixel values within each block.

4. The method of claim 1, wherein (iii) includes computing the block variance image by determining the overall change of pixmap pixel values from a mean pixmap pixel value for each of the blocks.

5. The method of claim 1, wherein (iv) includes computing the moving variance image by determining a mean of all possible windows of the block variance image, the windows having a predetermined size.

6. The method of claim 1, wherein step (iv) includes computing the moving variance image by determining a mean of all possible windows of the block variance image, the windows having a 15 by 15 pixel size.

7. A method of processing a pixmap image, comprising:

(a) generating a block average image of the pixmap image;

(b) generating a block variance image of the pixmap image;

(c) generating a variance threshold surface;

(d) thresholding the block variance image using the variance threshold surface to segment the block average image into foreground and background regions;

(e) generating a background image of the block average image based upon the segmented foreground and background regions of the block average image;

(f) generating a background threshold surface;

(g) thresholding the pixmap image using the background threshold surface to segment the pixmap image into foreground and background regions; and (h) generating a binary image based upon the segmented foreground and background regions of the pixmap image.

8. The method of claim 7, wherein (b) comprises:

(i) computing a moving variance image of the block variance image; and (ii) computing the variance threshold surface based upon the block variance image and the moving variance image.

9. The method of claim 7, wherein step (e) comprises replacing all pixels in the foreground region with estimated background pixel values.

10. The method of claim 7, wherein step (f) includes the steps of:

(i) creating a background image of the pixmap image by upsampling background image of the block average image;

(ii) computing one or more offset values; and (iii) generating a background threshold surface based upon the background image of the pixmap image and the one or more offset values.

11. A method of processing a pixmap image, comprising:

(a) generating a block average image of the pixmap image;

(b) generating a block variance image of the bitmap image;

(c) generating a variance threshold surface;

(d) thresholding the block variance image using the variance threshold surface to segment the block average image into foreground and background regions; and (e) generating a background image of the block average image based upon the segmented foreground and background regions of the block average image.

12. The method of claim 11, wherein (e) comprises replacing all pixels in the foreground region with interpolated background pixel values.

13. The method of claim 11, further comprising upsampling the background image of the block average image to create the background image of the pixmap image.

14. The method of claim 11, further comprising performing a normalizing operation on the pixmap image, the normalizing operation based upon the background image.

15. The method of claim 11, further comprising performing grey-scale extraction of features for character recognition based upon the background image.

16. An image processing system, comprising:

a memory device that stores instructions to process image data for a pixmap image, wherein the instructions include program logic to generate a block average image of the pixmap image, to generate a block variance image of the pixmap image, to generate a variance threshold surface, to threshold the block average image using the variance threshold surface to segment the block average image into foreground and background regions, to generate a background image of the block average image based upon the segmented foreground and background regions of the block average image, to generate a background threshold surface, to threshold the pixmap image using the background threshold surface to segment the pixmap image into foreground and background regions, and to generate a binary image based upon the segmented foreground and background regions of the pixmap image;

a processing unit that executes instructions stored in the memory device; and a display, controlled by the processor, for displaying image data.

17. An image processing system, comprising:

a memory device that stores instructions to process image data for a pixmap image, wherein the instructions include program logic to generate a block average image of the pixmap image, to generate a block variance image of the pixmap image, to generate a variance threshold surface, to threshold the block average image using the variance threshold surface to segment the block average image into foreground and background regions, and to generate a background image of the block average image based upon the segmented foreground and background regions of the block average image;

a processing unit that executes instructions stored in the memory device; and a display, controlled by the processor, for displaying image data.

18. The image processing system of claim 17, wherein the program logic performs a normalizing operation on the pixmap image, the normalizing operation based upon the background image.

19. The image processing system of claim 17, wherein the program logic performs grey-scale extraction of features for character recognition based upon the background image.

20. An article of manufacture for processing pixmap images, the article of manufacture comprising computer usable media including computer readable instructions embedded therein that causes a computer to perform:
   (a) generating a block average image of the pixmap image;
   (b) generating a block variance image of the pixmap image;
   (c) generating a variance threshold surface;
   (d) thresholding the block variance image using the variance threshold surface to segment the block average image into foreground and background regions;
   (e) generating a background image of the block average image based upon the segmented foreground and background regions of the block average image;
   (f) generating a background threshold surface;
   (g) thresholding the pixmap image using the background threshold surface to segment the pixmap image into foreground and background regions; and
   (h) generating a binary image based upon the segmented foreground and background regions of the pixmap image.

21. An article of manufacture for processing pixmap images, the article of manufacture comprising computer usable media including computer readable instructions embedded therein that causes a computer to perform:
   (a) generating a block average image of the pixmap image;
   (b) generating a block variance image of the bitmap image;
   (c) generating a variance threshold surface;
   (d) thresholding the block variance image using the variance threshold surface to segment the block average image into foreground and background regions; and
   (e) generating a background image of the block average image based upon the segmented foreground and background regions of the block average image.

22. The article of manufacture of claim 21, further causing the computer to normalize a pixmap image by performing an operation on the pixmap image, the operation based upon the background image.

23. The article of manufacture of claim 21, further causing the computer to process a pixmap image representing a grey-scale image by performing grey-scale extraction of features for character recognition based upon the background image.

24. A method of processing a pixmap image, comprising:
   (a) labeling at least some regions of the pixmap image as foreground using a variance segmentation technique;
   (b) generating a background image by replacing pixel values labeled as foreground regions in the pixmap image with estimated background pixel values; and
   (c) processing the pixmap image using the background image.

25. The method of claim 24, wherein the variance segmentation technique comprises:
   (i) subdividing the pixmap image into a plurality of blocks, each block representing a plurality of pixels;
   (ii) computing a block average image of the pixmap image;
   (iii) computing a block variance image of the pixmap image;
   (iv) computing a moving variance image of the block variance image;
   (v) computing a variance threshold surface based upon the moving variance image; and
   (vi) comparing the variance threshold surface to the block variance image to determine whether each pixel of the block average image represents a background pixel or a foreground pixel.

26. The method of claim 25, wherein the generation of the background image further comprises:
   (vii) creating the background image by replacing all foreground pixel values of the block average image with the estimated background pixel values; and
   (viii) upsampling the background image of the block average image to create the background image of the pixmap image.

27. The method of claim 26, wherein (c) comprises:
   (c1) computing one or more offset values;
   (c2) generating a background threshold surface based upon the background image and the one or more offset values;
   (c3) comparing the background threshold surface to the pixmap image to determine whether each pixel of the pixmap image represents a foreground pixel or a background pixel;
   (c4) assigning a first binary value to all foreground pixels and assigning a second binary value to all background pixels; and
   (c5) generating a binary image based upon the assigned first and second binary values.

28. The method of claim 24, wherein (c) comprises:
   (c1) computing one or more offset values;
   (c2) generating a background threshold surface based upon the background image and the one or more offset values;
   (c3) comparing the background threshold surface to the pixmap image to determine whether each pixel of the pixmap image represents a foreground pixel or a background pixel;
   (c4) assigning a first binary value to all foreground pixels and assigning a second binary value to all background pixels; and
   (c5) generating a binary image based upon the assigned first and second binary values.

29. The method of claim 24, wherein (c) comprises normalizing the pixmap image using the background image.

30. The method of claim 24, wherein (c) comprises performing grey-scale extraction of features for character recognition based upon the background image.

* * * * *